United States Patent
Castillo De Alvear et al.

(10) Patent No.: US 10,961,907 B2
(45) Date of Patent: Mar. 30, 2021

(54) AIRCRAFT INCORPORATING A LOW-TEMPERATURE BLEED SYSTEM

(71) Applicant: Airbus Operations, S.L., Madrid (ES)

(72) Inventors: Marta Castillo De Alvear, Getafe (ES); Juan Tomas Prieto Padilla, Getafe (ES)

(73) Assignee: Airbus Operations, S.L., Getafe (ES)

( * ) Notice: Subject to any disclaimer, the term of this patent is extended or adjusted under 35 U.S.C. 154(b) by 311 days.

(21) Appl. No.: 16/018,593

(22) Filed: Jun. 26, 2018

(65) Prior Publication Data

US 2018/0371991 A1   Dec. 27, 2018

(30) Foreign Application Priority Data

Jun. 26, 2017  (EP) .................................. 17382396

(51) Int. Cl.
*B64D 13/08*  (2006.01)
*F02C 6/08*  (2006.01)
(Continued)

(52) U.S. Cl.
CPC ................ *F02C 6/08* (2013.01); *B64D 13/02* (2013.01); *B64D 13/08* (2013.01); *B64D 15/04* (2013.01);
(Continued)

(58) Field of Classification Search
CPC ........ B64D 13/02; B64D 13/08; B64D 15/04; B64D 2013/0607; B64D 2013/0618; B64D 2033/0233; B64D 2033/024; B64D 29/02; F02C 7/14; F02C 7/185; F02K 3/115; F05D 2260/213; F28D 2021/0021
(Continued)

(56) References Cited

U.S. PATENT DOCUMENTS

2009/0235670 A1* 9/2009 Rostek .................... B64D 13/02
                                                                   60/785
2014/0000279 A1* 1/2014 Brousseau ................ F02C 9/18
                                                                   60/782
(Continued)

FOREIGN PATENT DOCUMENTS

EP   0 743 434 A1   11/1996
FR   2 891 313 A1    3/2007
(Continued)

OTHER PUBLICATIONS

European Search Report for European Application No. 17382396 dated Nov. 30, 2017.

*Primary Examiner* — Claude J Brown

(74) *Attorney, Agent, or Firm* — Jenkins, Wilson, Taylor & Hunt, P.A.

(57) ABSTRACT

An aircraft incorporating a bleed system for extracting compressed air from the aircraft main engines to be used as a source of pressurized air for the aircraft. The bleed air system includes a first pre-cooler installed at one of the main engines nacelle and coupled with the bleed duct, and adapted for cooling down the bleed air extracted from the main engine, and a second pre-cooler installed at the pylon and coupled with bleed duct and downstream the first pre-cooler. The working temperature of the aircraft bleed system is reduced, down to max 200° C., so that the dimensions of an Over Heat Detection System (OHDS) is reduced.

4 Claims, 2 Drawing Sheets

(51) Int. Cl.
  *F02C 7/14*    (2006.01)
  *B64D 13/02*   (2006.01)
  *B64D 15/04*   (2006.01)
  *F02K 3/06*    (2006.01)
  *F02K 3/115*   (2006.01)
  *B64D 29/02*   (2006.01)
  *F02C 7/18*    (2006.01)
  *F02C 9/18*    (2006.01)
  *B64D 13/06*   (2006.01)
  *F28D 21/00*   (2006.01)
  *B64D 33/02*   (2006.01)

(52) U.S. Cl.
  CPC .............. *B64D 29/02* (2013.01); *F02C 7/14* (2013.01); *F02C 7/185* (2013.01); *F02C 9/18* (2013.01); *F02K 3/06* (2013.01); *F02K 3/115* (2013.01); *B64D 2013/0607* (2013.01); *B64D 2013/0618* (2013.01); *B64D 2033/024* (2013.01); *B64D 2033/0233* (2013.01); *F05D 2260/213* (2013.01); *F28D 2021/0021* (2013.01)

(58) Field of Classification Search
  USPC ........................................................ 244/234 B
  See application file for complete search history.

(56) References Cited

U.S. PATENT DOCUMENTS

2014/0325991 A1* 11/2014 Liew .................... B64D 41/00
                                                    60/785
2016/0153359 A1*  6/2016 Leamy .................... F02C 7/32
                                                    60/782

FOREIGN PATENT DOCUMENTS

WO   WO 2012/125895 A1   9/2012
WO   WO 2013/079100 A1   6/2013

\* cited by examiner

AIRCRAFT INCORPORATING A LOW-TEMPERATURE BLEED SYSTEM

CROSS-REFERENCE TO RELATED APPLICATION

This application claims the benefit of and priority to European patent application No. 17382396.4 filed on Jun. 26, 2017, the entire disclosure of which is incorporated by reference herein.

TECHNICAL FIELD

The disclosure herein refers in general to aircraft bleed systems.

BACKGROUND

Most current civil aircrafts incorporate a bleed system that take pressurized air from one the main engine compressor stages, to be used as a source of high-pressure air. This pressurized air from the engine is cooled down before being distributed along the aircraft, using cold air from the engine fan.

Some of the consumers of high-pressure bleed air are the following systems:
Cabin air conditioning and pressurization;
Conditioned Supply Air System (CSAS) for the Fuel Tank Inerting System (FTIS);
Wing Anti-Ice (WAI) system;
Engine starting;
Water and waste;
Hydraulic reservoirs pressurization.

However, the pressure and temperature required by each one of above-listed consumers is different. For example, the Wing Anti Ice (WAI) needs high temperature, whereas the rest of consumers are more interested in the flow mass (pressure).

Nonetheless, a large Pre-Cooler (PCE) is needed to cool down the air extracted from the gas-turbine engines to 200° C. required for the (WAI). Typically a Pre-cooler weights around 90 Kgrs., and cool down air temperature from max ~600° C. to ~200° C.

Taking into account that new turbofans engines have higher by-pass ratio, the size of the Pre-Cooler (PCE) to get more fan air, is hardly to be increased any more.

On the other hand, hot air ducts are running through the whole aircraft, and in order to detect any leak or rupture of those ducts, that can cause catastrophic damages, an Over Heat Detection System (OHDS) is commonly used.

FIG. 1 shows a conventional bleed air system comprising a bleed duct (1) running from the aircraft main engines (2) and passing through the pylon (3) and wings (4). A large pre-cooler (5) is installed at the pylon (3) and it is used to cool down the air extracted from the gas-turbine engines to a suitable temperature, typically 200° C., required for the (WAI) and for the rest of the consumers, for example the air conditioning PACKS or for the FTIS. A cold air duct (6) communicates a cold air intake (7) (for example fan air of the bypass duct (FAV) of a turbofan) with the pre-cooler (5).

As shown in FIG. 1, an (OHDS) is required along the high-temperature ducts (1) of the bleed system downstream the pre-cooler (5).

However, it is know that (OHDS) are not fully reliable due to their complexity, and that airlines have many operation delays caused by OHDS malfunction. It is therefore desirable to eliminate or at least reduce these problems.

These problems will be aggravated with new aircraft generations having more components manufactured with composites.

SUMMARY

An object of the disclosure herein is to reduce the working temperature of an aircraft bleed system. In the present description, low-temperature is to be understood as lower than 400° C.

Another object of the disclosure herein, related to the first one, is to eliminate or at least reduce the extension of the aircraft Over Heat Detection System (OHDS).

The disclosure herein is based on the replacement of the traditional large pre-cooler shown in FIG. 1, by two pre-coolers (heat-exchangers) of reduced size connected in series at the bleed air system. A main pre-cooler cool downs most of the air flow in order to supply the WAI, and a second pre-cooler, smaller than the main pre-cooler, further reduce the temperature for the Packs and other consumers.

In this way, the working temperature of the aircraft bleed system is reduced, for example down to ~160° C. Most preferably, the bleed air system of the disclosure herein is adapted to operate max 200° C., so that no hazard due to high ignition temp above 200° C.

The disclosure herein refers to an aircraft incorporating a bleed system adapted for extracting compressed air from the aircraft main engines to be used as a source of pressurized air for the aircraft, for example for the air-conditioning Packs or other consumers as explained above.

The bleed air system comprises:
a duct running from the main engines and passing through the aircraft pylon and wings;
a first pre-cooler installed at one of the main engines nacelle and coupled with the bleed duct, and adapted for cooling down the bleed air extracted from the main engine; and
a second pre-cooler installed at the pylon and coupled series (cascaded) with bleed duct and downstream the first pre-cooler.

The aircraft additionally comprises a wing anti-ice protection system coupled with the bleed air duct upstream the second pre-cooler, so that the pressurized air for wing anti-ice protection system can be supplied by the first pre-cooler.

Some of the main advantages of the disclosure herein are:
full elimination of the OHDS at the wing (due to temp are below 200° C.), and its elimination at most of the pylons, and possibly at the aircraft Auxiliary Power Unit (APU);
reduced size of the ATA21 heat exchanger;
lower temperature qualification for wings ducts;
less weight on titanium cover insulation on overall ducts as might not be needed or thinner (material reduction).

BRIEF DESCRIPTION OF THE DRAWINGS

Preferred embodiments of the disclosure herein are henceforth described with reference to the accompanying drawings, wherein.

DETAILED DESCRIPTION

Figure 1:
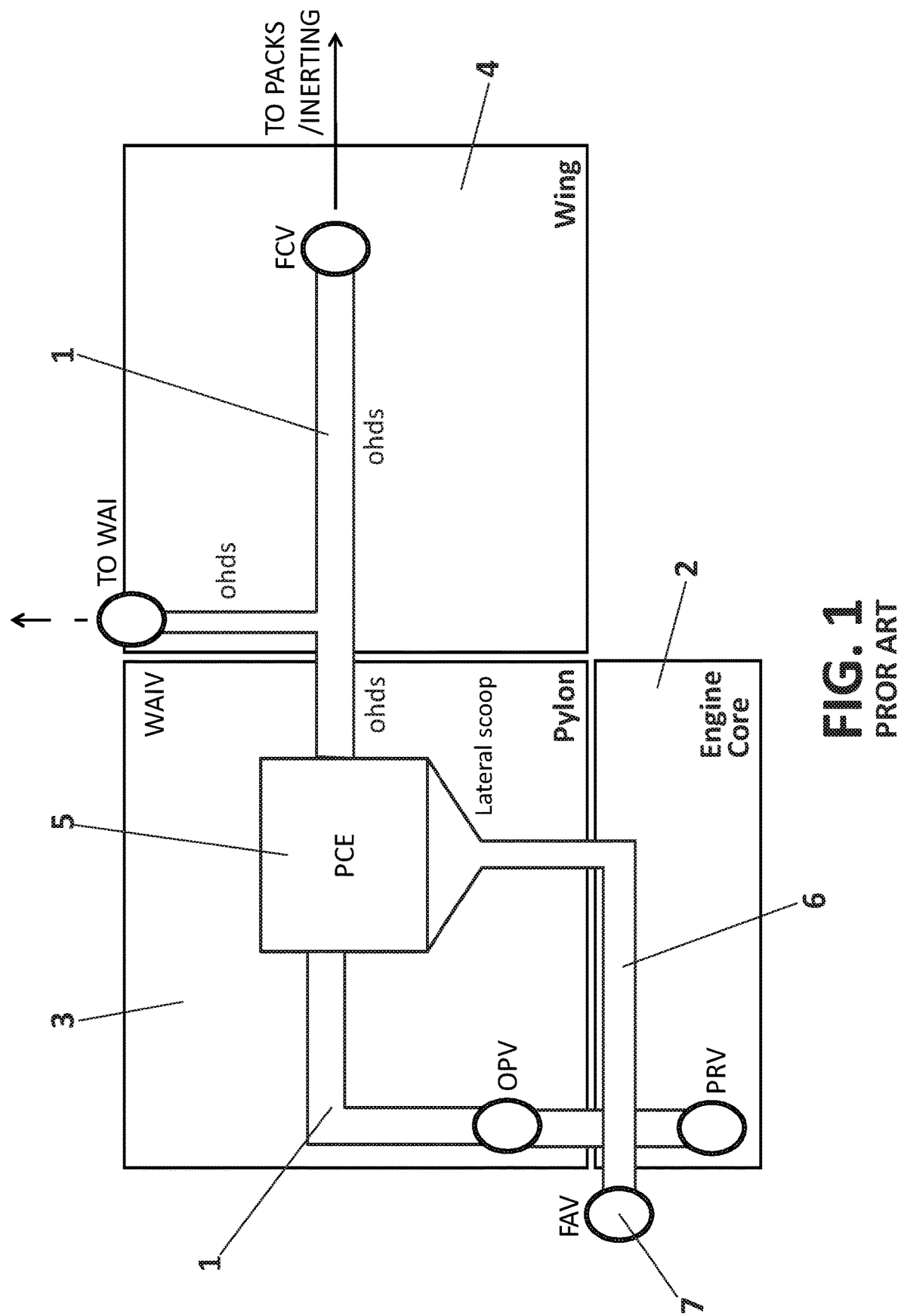
FIG. 1 is an schematic representation of a conventional bleed system of an aircraft, according to the prior art.
Figure 2:
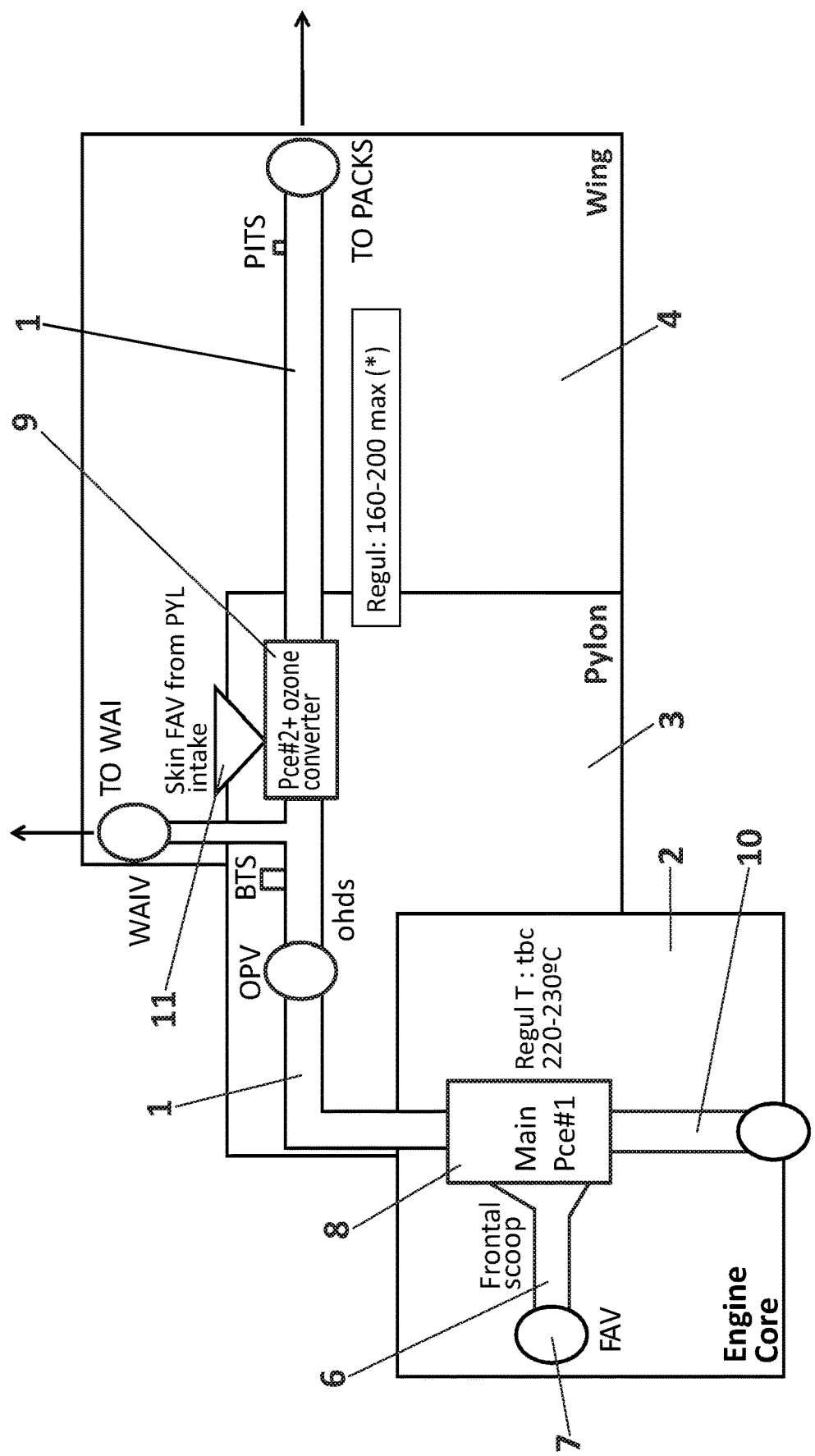
FIG. 2 is an schematic representation of a bleed system of an aircraft, according to the disclosure herein.

FIG. 2 shows schematically a bleed system according to the disclosure herein installed in an aircraft, wherein a bleed air duct (1) runs from the main engines (2) and passes through the pylon (3) and wings (4) to supply pressurized air to the air-conditioning Packs and other consumers.

The bleed air system comprises a main (first) pre-cooler (8) installed at one of the main engines nacelles, and coupled with the bleed duct (1) in order to cool down the bleed air extracted from the main engine. Preferably this first pre-cooler (8) is adapted to operate at a constant temperature, for example within the range 220-230° C.

The first pre-cooler (8) receives through a duct (10) high-temperature and high-pressure air extracted from a main engine, which is cooled down by cold air, for example fan air received from a cold air duct (6).

The bleed air system comprises a second pre-cooler (9) installed at the pylon (3) and coupled with bleed duct (1) downstream the first pre-cooler (8). Preferably, this second pre-cooler (9) integrates an ozone converter in order to reduce even more the overall weight.

An Over Pressure Valve (OPV) and a Bleed Temperature Sensor (BTS), are installed at the duct (1) between the two pre-coolers (8,9).

The air flow through the second pre-cooler (9) can be controlled by the FAV of the first pre-cooler (8) and through the (BTS).

A Fan Air Valve (FAV) (11) can be provided to control a cold air intake at the pylon, used as a heat sink for the second pre-cooler (9).

The aircraft wing anti-ice protection system (WAI) is coupled with the bleed air duct (1) upstream the second pre-cooler (9), through a WAI Valve (WAIV) so that the pressurized air for wing anti-ice protection system is supplied by the first pre-cooler (8).

As shown in FIG. 2, the Over Heat Detection System (OHDS) for the bleed air system, extends only between the first and second pre-coolers (8,9), that is, there is no (OHDS) at the wing and part of the pylon.

A Pack Inlet Temperature Sensor (PITS) from ATA21 can control the temperature (if too low) through the FAV of the first pre-cooler (8).

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a", "an" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims.

The invention claimed is:

1. An aircraft incorporating a bleed air system for extracting compressed air from aircraft main engines to be used as a source of pressurized air for the aircraft, the bleed air system comprising a bleed air duct running from the aircraft main engines and passing through an aircraft pylon and wings;
wherein the bleed air system comprises:
a first pre-cooler installed at one of a main engine nacelle and coupled with the bleed air duct, and adapted for cooling down bleed air extracted from the main engine; and
a second pre-cooler installed at the pylon and coupled with the bleed air duct and downstream the first pre-cooler; and
wherein a wing anti-ice protection system is coupled with the bleed air duct upstream the second pre-cooler, so that pressurized air for wing anti-ice protection system can be supplied by the first pre-cooler.

2. The aircraft according to claim 1, wherein the second pre-cooler comprises an ozone converter.

3. The aircraft according to claim 1, further comprising an Over Heat Detection System for the bleed air duct, and wherein the Over Heat Detection System extends exclusively between the first and second pre-coolers.

4. The aircraft according to claim 1, further comprising air-conditioning packs coupled with the bleed air system downstream the second pre-cooler.

* * * * *